US009037304B2

(12) United States Patent
Anderton et al.

(10) Patent No.: US 9,037,304 B2
(45) Date of Patent: May 19, 2015

(54) FLUID DELIVERY SYSTEM AND METHOD

(75) Inventors: Peter William Anderton, Peoria, IL (US); Khanh Tu Ngo, Peoria, IL (US); Apostolis Kouvelis, Lalor (AU); Marcin Domink Blaszkowski, Doreen (AU)

(73) Assignee: Caterpillar Inc., Peoria, IL (US)

( * ) Notice: Subject to any disclaimer, the term of this patent is extended or adjusted under 35 U.S.C. 154(b) by 458 days.

(21) Appl. No.: 13/468,608

(22) Filed: May 10, 2012

(65) Prior Publication Data

US 2013/0298994 A1 Nov. 14, 2013

(51) Int. Cl.

| | |
|---|---|
| ***G05D 7/00*** | (2006.01) |
| ***G01P 11/00*** | (2006.01) |
| ***G01C 22/00*** | (2006.01) |
| ***B05B 17/04*** | (2006.01) |
| ***B05B 9/06*** | (2006.01) |
| ***B05B 3/00*** | (2006.01) |
| ***F17D 3/01*** | (2006.01) |
| ***E21F 5/02*** | (2006.01) |
| ***E01H 3/02*** | (2006.01) |

(52) U.S. Cl.
CPC ... *F17D 3/01* (2013.01); *E21F 5/02* (2013.01); *E01H 3/02* (2013.01)

(58) Field of Classification Search
CPC ....... E01H 3/02; E01H 10/007; B05B 13/005; E21F 5/02; G05D 2201/0202; E21C 35/223; G01C 21/343
USPC .......... 700/275, 282, 283; 702/127, 142, 149, 702/155, 158, 176; 239/1, 11, 67–71, 74, 239/146, 147, 149, 155–157, 172, 176, 548, 239/562, 722
See application file for complete search history.

(56) References Cited

U.S. PATENT DOCUMENTS

| | | | | |
|---|---|---|---|---|
| 4,380,353 | A * | 4/1983 | Campbell et al. | 299/12 |
| 6,954,719 | B2 | 10/2005 | Carter, Jr. et al. | |
| 7,730,649 | B1 * | 6/2010 | Currey | 37/444 |
| 7,896,258 | B2 | 3/2011 | Hoisington et al. | |
| 8,320,627 | B2 * | 11/2012 | McDaniel et al. | 382/104 |
| 8,360,343 | B2 * | 1/2013 | Gudat et al. | 239/172 |
| 8,376,244 | B2 * | 2/2013 | Anderton et al. | 239/11 |
| 8,444,062 | B2 * | 5/2013 | Anderton et al. | 239/156 |
| 2011/0160920 | A1 | 6/2011 | Orr et al. | |
| 2011/0186657 | A1 * | 8/2011 | Haviland | 239/722 |
| 2013/0099017 | A1 * | 4/2013 | Gudat et al. | 239/1 |

* cited by examiner

*Primary Examiner* — Crystal J Barnes-Bullock
(74) *Attorney, Agent, or Firm* — Finnegan, Henderson, Farabow, Garrett & Dunner, LLP

(57) ABSTRACT

A method of controlling a fluid delivery machine configured to deliver fluid on a worksite is disclosed. In the method, operation of a power source of the fluid delivery machine is controlled with a control module. Fluid delivery on the worksite is also controlled by the control module.

19 Claims, 6 Drawing Sheets

FLUID DELIVERY SYSTEM AND METHOD

TECHNICAL FIELD

This disclosure relates generally to a system and a method for fluid delivery and, more particularly, to a fluid delivery system and method for a mobile machine.

BACKGROUND

Work environments associated with certain industries, such as the mining and construction industries, are susceptible to undesirable dust conditions. Mining, excavation, and construction sites, in particular, are susceptible to dust due to the nature of the materials composing the worksite surface. For example, ground surfaces of coal, shale, stone, etc., erode easily, and thus tend to produce significant amounts of dust. Moreover, typical work operations performed at these sites exacerbate the dust conditions. At a mine site, for example, cutting, digging, and scraping operations break up the ground surface, generating dust. In addition, heavy machinery, such as haul trucks, dozers, loaders, excavators, etc., traveling on such sites disturb settled dust, thereby increasing the dust level of the air.

These dust conditions may reduce the efficiency the worksite. For example, dust may impair visibility, interfere with work operations on the site, and require increased equipment maintenance and cleaning. In addition, dust conditions may affect the comfort, health, and safety of worksite personnel. To alleviate these conditions, a water truck may be used to reduce the amount of dust on the worksite. Specifically, the water truck periodically drives over the worksite and sprays the ground surface with water.

A mine site often includes sloped haul roads, including an entrance and exit ramp to the site. While it is desirable to prevent dust conditions on the haul roads, care must be taken to avoid spraying the entire surface of the road with water. Instead, portions of the road may be sprayed with water, while other portions of the road may remain dry. This way, if heavy machinery driving on the road begins to slide because of wet surface conditions, the heavy machinery will eventually encounter a dry portion of the road and stop sliding, and thereby avoid unintentionally leaving the road surface.

U.S. Pat. No. 7,896,258 to Hoisington et al. discloses a water truck that intermittently sprays a road surface with water. In the Hoisington patent, water is sprayed while the truck travels a first interval equal to a specified distance (e.g., 90, 120, 150, or 180 feet), and then the water is shut off while the truck travels a second interval equal to that same specified distance. The Hoisington patent uses a ground speed sensor to determine the distance that the truck travels, and provides a signal to a programmable logic controller (PLC) that turns the water on and off based on the travel distance.

The water truck described in the Hoisington patent suffers from numerous disadvantages, however. For example, although the Hoisington patent discloses that the water truck turns the water on and off based on the distance the truck travels, the ground speed sensor may not be able to accurately determine travel distances, especially when the truck is driving at a relatively slow speed. Thus, the water truck in the Hoisington patent may not be able to accurately control water delivery and shut-off.

The disclosed fluid delivery system and method are directed to overcoming one or more of the problems set forth above and/or other problems of the prior art.

SUMMARY

The disclosure may provide a method of controlling a fluid delivery machine configured to deliver fluid on a worksite. In the method, operation of a power source of the fluid delivery machine is controlled with a control module. Fluid delivery on the worksite is also controlled by the control module.

The disclosure may further provide another method of controlling a fluid delivery machine configured to deliver fluid on a worksite. In the method, operation of an engine of the fluid delivery machine is controlled with a control module. A fluid delivery distance over which the fluid delivery machine is to drive on the worksite while delivering fluid to the worksite is determined, for a fluid delivery mode. A fluid non-delivery distance over which the fluid delivery machine is to drive on the worksite without delivering fluid is determined, for a fluid non-delivery mode. Either the fluid delivery mode or the fluid non-delivery mode is selected as an initial operating mode in which the fluid delivery machine is to begin driving on the worksite. The fluid delivery mode or the fluid non-delivery mode that was not selected as the initial operating mode is determined to be a subsequent operating mode in which the fluid delivery machine is to drive on the worksite after completion of the initial operating mode. The fluid delivery machine is switched to the initial operating mode when the fluid delivery machine begins to drive on the worksite. The fluid delivery machine is operated in the initial operating mode while a first total distance traveled by the fluid delivery machine is less than either the fluid non-delivery distance when the initial operating mode is the fluid non-delivery mode, or the fluid delivery distance when the initial operating mode is the fluid delivery mode, the first total distance being determined by the engine control module. The fluid delivery machine is switched from the initial operating mode to the subsequent operating mode upon completion of the initial operating mode. The fluid delivery machine is operated in the subsequent operating mode while a second total distance traveled by the fluid delivery machine is less than either the fluid non-delivery distance when the subsequent operating mode is the fluid non-delivery mode, or the fluid delivery distance when the subsequent operating mode is the fluid delivery mode, the second total distance being determined by the engine control module.

The disclosure may still further provide a non-transitory computer readable medium storing a program that, when executed by a processor, performs either of the above-disclosed methods of controlling a fluid delivery machine configured to deliver fluid on a worksite.

DETAILED DESCRIPTION

Figure 1:
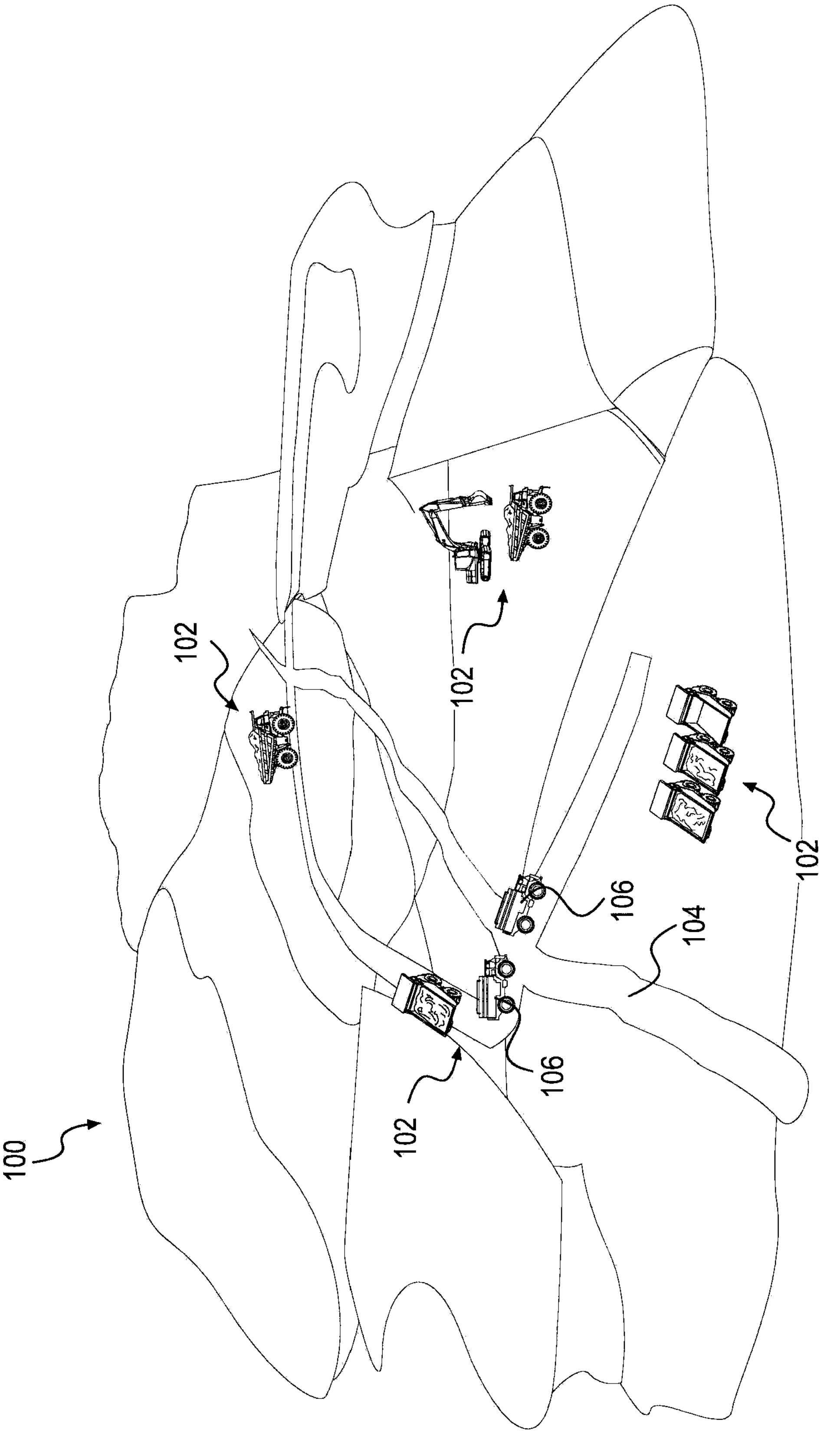
FIG. 1 illustrates an exemplary worksite on which the disclosed fluid delivery system and method may be used.

FIG. 1 illustrates an exemplary worksite 100 on which the disclosed fluid delivery system and method may be used. As shown in the figure, worksite 100 may be a surface mine site, where mining operations generate dust levels that create undesirable conditions for worksite personnel. For example, the dust may impair visibility, reduce air quality, require frequent equipment maintenance or cleaning, or otherwise hinder operations on worksite 100. The disclosed fluid delivery system and method is not limited to use on a mine site, however, and worksite 100 may alternatively be a construction site, a landfill, or any site on which undesirable dust conditions may arise.

As shown in FIG. 1, a variety of mobile machines 102 may operate on worksite 100. Mobile machines 102 may include any combination of operator-controlled machines, autonomous (i.e., unmanned) machines, or semi-autonomous machines. Mobile machines 102 may include, for example, off-highway haul trucks, articulated trucks, excavators, loaders, dozers, scrapers, or other types of earth-working machines for excavating material from worksite 100 and transporting the excavated material to another location. In connection with various work operations, mobile machines 102 may travel along haul roads 104 between excavation locations, dumping areas, and other locations on worksite 100. One or more of the haul roads 104 may be sloped, and one or more of the haul roads 104 may act as an entrance ramp into and an exit ramp out of worksite 100. Aside from mobile machines 102, one or more mobile fluid delivery machines 106 (generally referred to as "water delivery trucks" or "water trucks") may travel on worksite 100. In particular, fluid delivery machine 106 may be configured to travel worksite 100 along haul roads 104 and to deliver fluid (e.g., spray water) onto the ground surface of worksite 100 to control dust levels on haul roads 104.

Figure 2:
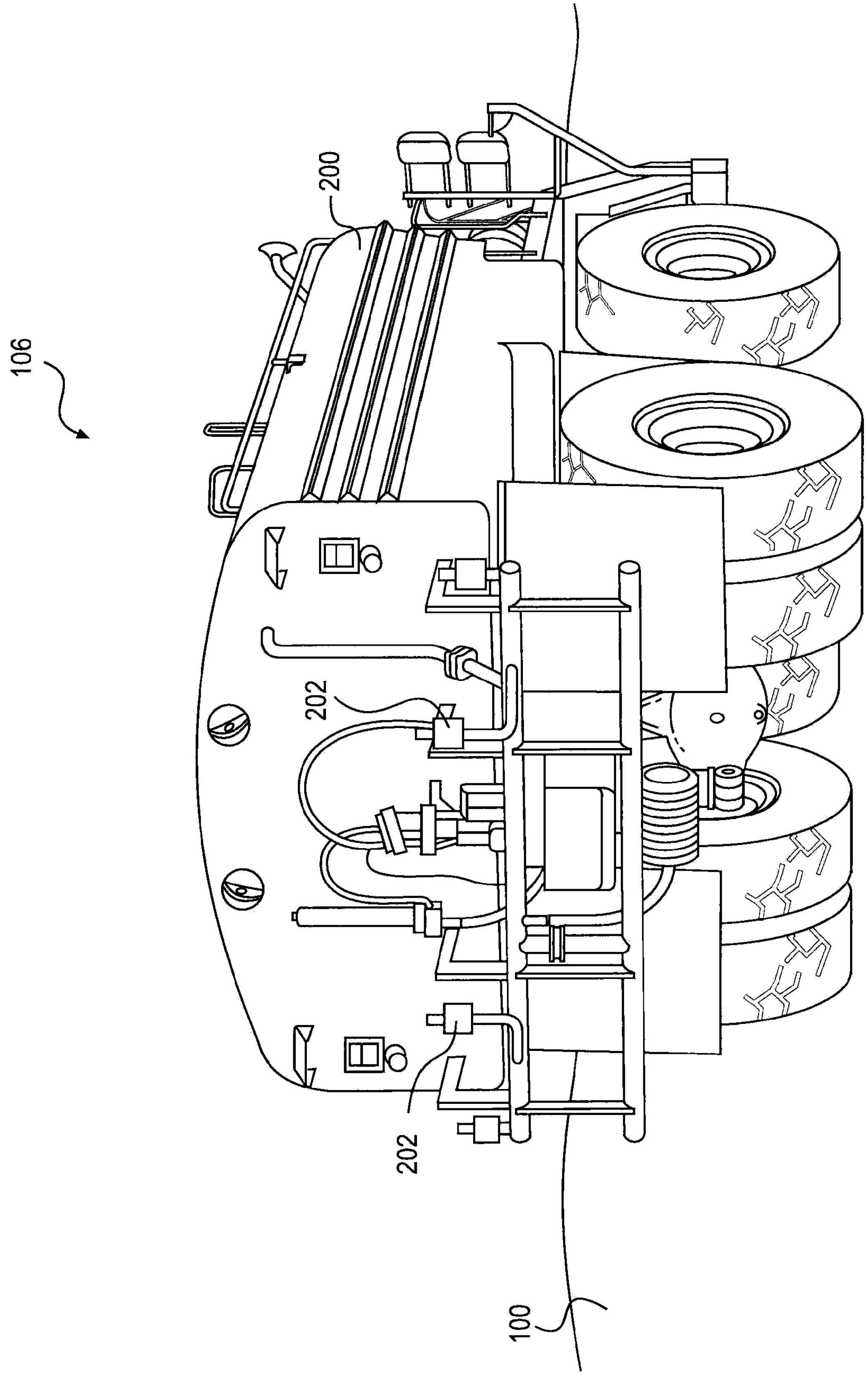
FIG. 2 illustrates an exemplary mobile fluid delivery machine shown in FIG. 1, consistent with the disclosure.

FIG. 2 illustrates an exemplary mobile fluid delivery machine 106 on worksite 100, consistent with the disclosure. As shown in the figure, fluid delivery machine 106 may be an off-highway truck converted for use to deliver fluid. For example, fluid delivery machine 106 may be fitted with, among other things, a fluid tank 200 configured to store fluid (e.g., water); various piping, hoses, pumps, and valves; and one or more spray heads 202 that are configured to spray the fluid stored in tank 200 onto the ground surface of worksite 100 as fluid delivery machine 106 travels across worksite 100, thereby controlling dust conditions on worksite 100. Alternatively, fluid delivery machine 106 may be another type of mobile machine configured to distribute water or other fluids in another application. For example, fluid delivery machine 106 may be a tractor towing a trailer that is configured to distribute chemicals, water, or other materials (e.g., pesticide, fertilizer, etc.) in an agricultural setting; an on-highway truck configured to spray a solution (e.g., a saline solution) on roads, runways, or parking lots to melt snow and ice; or another type of vehicle configured to distribute fluid in another environment.

Figure 3:
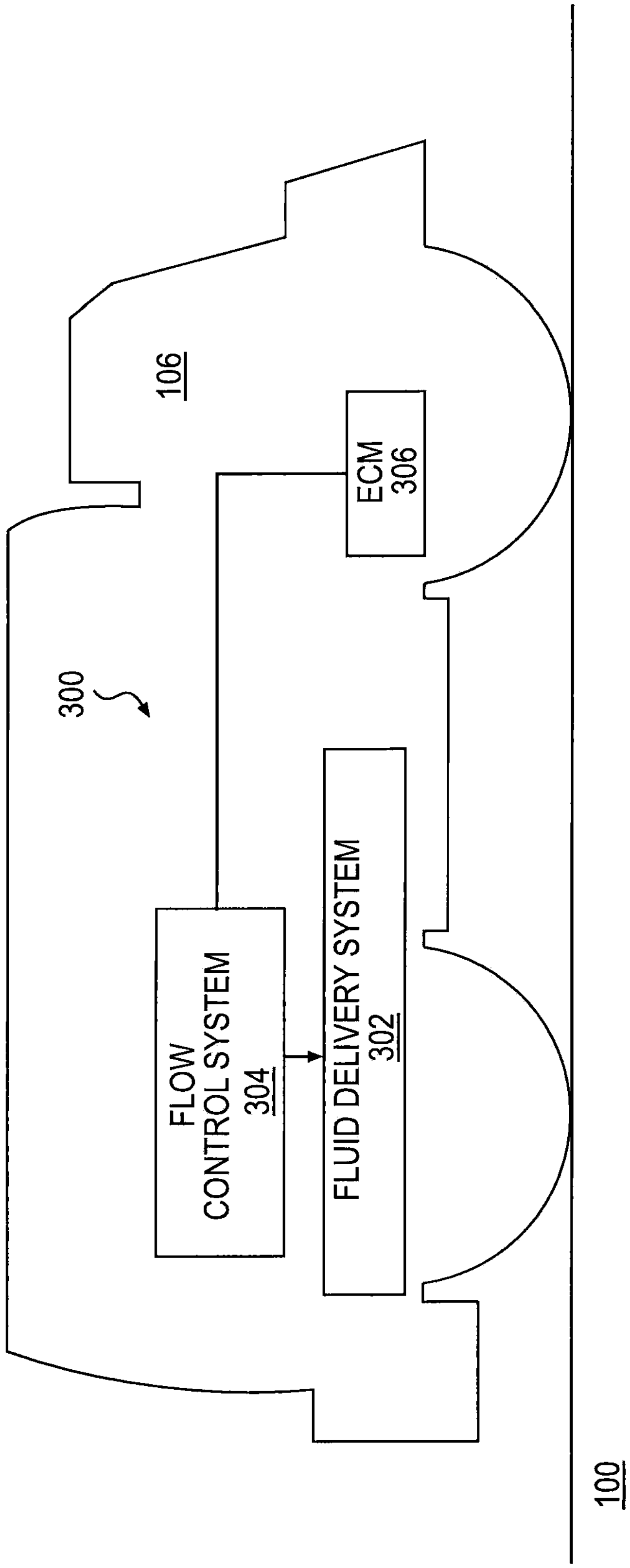
FIG. 3 illustrates a schematic view of an exemplary fluid delivery control system that may be used on the fluid delivery machine of FIG. 2, consistent with the disclosure.

FIG. 3 illustrates an exemplary fluid delivery control system 300, consistent with the disclosure. As shown in the figure, fluid delivery control system 300 is installed on fluid delivery machine 106. Fluid delivery control system 300 may include a fluid delivery system 302, a flow control system 304, and an engine control module (ECM) 306.

Fluid delivery system 302 may be configured to distribute fluid (e.g., spray water) onto the ground surface of worksite 100, to thereby alleviate dust conditions on worksite 100. Further details of fluid delivery system 302 are discussed below with respect to FIG. 4. Flow control system 304 may be programmed to command fluid delivery system 302 to deliver fluid at fixed or variable flow rates. By way of specific example, flow control system 304 may provide a command for fluid delivery system 302 to deliver fluid at a constant flow rate, or may provide a command to deliver fluid at a flow rate that varies based on the speed of fluid delivery machine 106.

As further shown in FIG. 3, fluid delivery machine 106 may include ECM 306. ECM 306 may control, for example, a power source that provides motive power to drive fluid delivery machine 106 across worksite 100, based on information from different systems or subsystems of fluid delivery machine 106, including information from monitoring the power source itself. In particular, when the power source is an internal combustion engine, ECM 306 may control one or more of a quantity of fuel that is injected into each cylinder per engine cycle, ignition timing, variable valve timing, and other operations of other engine components. The information received by ECM 306 may be received from one or more sensors, for example, which monitor the different systems and subsystems of fluid delivery machine 106 and/or monitor the power source. ECM 306 also may provide or output a signal that is used by flow control system 304 to determine when fluid delivery system 302 is to be turned on and turned off. Further details of ECM 306 are discussed below with reference to FIG. 5.

Figure 4:
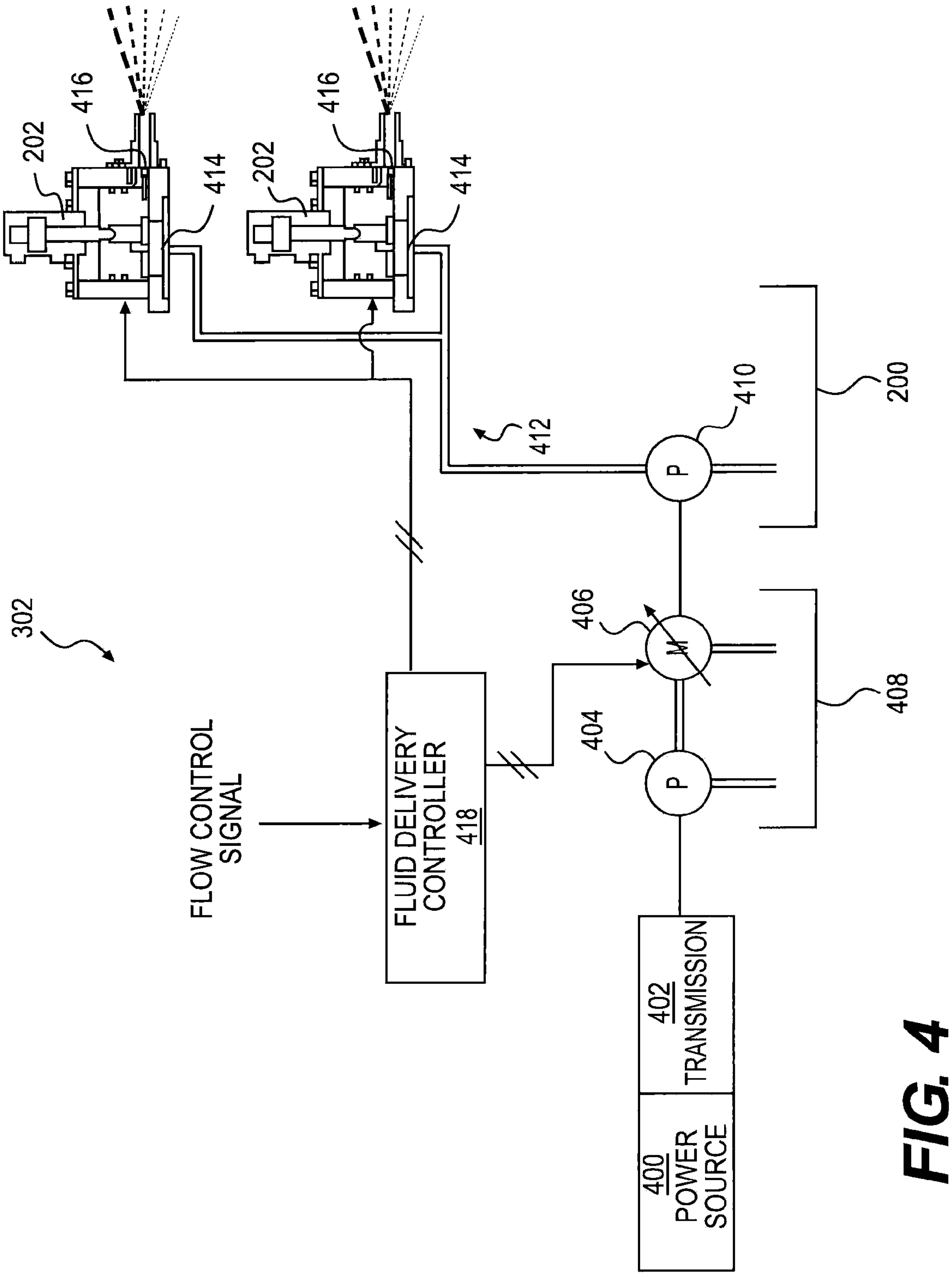
FIG. 4 illustrates a schematic view of an exemplary fluid delivery system that may be used on the fluid delivery machine of FIG. 2, consistent with the disclosure.

FIG. 4 illustrates fluid delivery system 302 in greater detail. As shown, fluid delivery system 302 may include a power source 400 configured to supply power to propel fluid delivery machine 106, to power fluid delivery system 302, and/or to power other systems on-board fluid delivery machine 106. That is, the power from power source 400 may be used for purposes other than for providing motive power for fluid delivery machine 106. For example, an off-highway truck, prior to being adapted for fluid delivery, may have been designed to use power from power source 400 for auxiliary applications, such as raising and lowering a truck bed. Power source 400 may include, for example, an internal combustion engine, an electric motor, a combustion engine-electric hybrid system, or another type of power source known in the art.

Fluid delivery system 302 may also include a transmission 402 coupled to receive power from power source 400. Transmission 402 may be a manual step transmission, an automatic step transmission, an automatic continuously-variable transmission, or any other type of transmission. Transmission 402 may receive the power output from power source 400, convert a torque of the power output based on a selected transmission ratio (e.g., gear), and couple the converted power to one or more traction devices (not shown) (e.g., wheels, tracks, treads, etc.) to propel fluid delivery machine 106. In addition, transmission 402 may couple some of the converted power for fluid delivery, as discussed below.

Fluid delivery system 302 may include a hydraulic pump 404 and a hydraulic motor 406. In one embodiment, pump 404 may be a fixed-displacement pump and motor 406 may be a variable-displacement motor. For example, an off-highway truck adapted for use as a water truck may have an existing fixed-displacement pump 404 already in place for purposes other for than delivering fluid to worksite 100. Adding a variable-displacement motor 406 may offer advantages in controlling the amount of fluid distributed, for example, by enabling control of fluid flow regardless of engine speed or ground speed. In this manner, fixed displacement pump 404 may still be used for applications other than fluid delivery without being affected by changes in fluid delivery parameters. For example, pump 404 may drive motor 406, and may also use this fluid for cooling brake components (not shown). The brake cooling system may not be affected by load changes from fluid delivery system 302. In alternative embodiments, pump 404 and motor 406 may be other suitable combinations of fixed- and/or variable-displacement devices, such as a variable-displacement pump 404 and a fixed-displacement motor 406, or a variable-displacement pump 404 and a variable-displacement motor 406. Alternatively, instead of pump 404 and motor 406, any other type of open- or closed-loop hydrostatic system may be employed.

Continuing with FIG. 4, an input of pump 404 may be mechanically or otherwise coupled to transmission 402 to receive the converted power output of power source 400. An output of pump 404, in turn, may be hydraulically coupled to an input of hydraulic motor 406 via well-known hydraulic components. The converted power output may drive pump 404 to pump hydraulic fluid from a hydraulic tank 408 through the output of pump 404, thereby driving motor 406. Motor 406, in turn, may receive the pumped hydraulic fluid from pump 404 to drive a mechanical output, and may return the hydraulic fluid to hydraulic tank 408. An output of motor 406 may be mechanically coupled to drive a fluid pump 410. Fluid pump 410 may be a fixed-displacement pump or a variable-displacement pump. In addition, other configurations may be used. For example, pump 404 and motor 406 may be omitted, and a variable-displacement fluid pump 410 may be coupled directly to transmission 402.

As shown in FIG. 4, pump 410 may be fluidly coupled to fluid tank 200 and one or more spray heads 202, by fluid lines 412. Pump 410, driven by motor 406, may draw fluid (e.g., water) from fluid tank 200 and deliver the fluid to spray heads 202 via fluid lines 412. Spray heads 202, in turn, may spray the fluid onto the ground surface of worksite 100, thereby wetting the ground surface and controlling dust conditions on worksite 100. Spray heads 202 may each include an inlet passage 414 for receiving the fluid from fluid lines 412. Spray heads 202 may also each include an output orifice 416 through which the fluid is sprayed onto worksite 100.

In the example shown in FIG. 4, two (2) spray heads 202 are illustrated. As shown in FIG. 2, one spray head 202 may be located to the right and rear of fluid delivery machine 106, and arranged to spray behind and to the right of fluid delivery machine 106 with respect to the direction of travel, while the other spray head 202 may be located to the left and rear of fluid delivery machine 106, and arranged to spray behind and to the left of fluid delivery machine 106 with respect to the direction of travel. A different number of spray heads 202 may be used on fluid delivery machine 106, however. Further, spray heads 202 may be mounted on fluid delivery machine 106 at any desired location or orientation to provide suitable coverage of worksite 100. In one embodiment, spray heads 202 may be positioned to provide a desired spray pattern having a width suitable to cover a predetermined surface area of worksite 100, such as a typical width of mine haul road 104, without water sprayed from spray heads 202 overlapping.

Although FIG. 4 illustrates spray heads 202 as connected by common fluid lines 412, spray heads 202 may be independently controllable. For example, orifices 416 may be continuously-variable between a fully-closed position and a fully-open position. Alternatively, orifices 416 may be capable of only being fully-closed or fully-opened. In addition, orifices 416 may be controlled to vary the width or distribution of the spray at least in a direction perpendicular to the direction of travel of fluid delivery machine 106. In one embodiment, for example, orifices 416 may be controlled to provide a narrow spray, a medium-width spray, a wide spray, or a spray continuously-variable between a narrow spray and a wide spray. In this manner, haul roads 104 of varying widths may be sprayed with fluid.

Fluid delivery system 302 may further include a fluid delivery controller 418 configured to control operations of fluid delivery system 302. Specifically, fluid delivery controller 418 may receive a signal from flow control system 304, which is used to turn fluid delivery system 302 on and off to intermittently water haul roads 104.

Fluid delivery controller 418 may embody, for example, a general microprocessor capable of controlling numerous functions of fluid delivery system 302. Fluid delivery controller 418 may include a memory, a secondary storage device, a processor (e.g., a CPU), or any other components for executing programs to perform the disclosed functions of fluid delivery system 302. Various other circuits may be associated with fluid delivery controller 418, such as power supply circuitry, signal conditioning circuitry, data acquisition circuitry, signal output circuitry, signal amplification circuitry, and other types of circuitry known in the art. It is to be understood that fluid delivery controller 418 may be various types of processors, such an ECM on the fluid delivery system. Alternately, fluid delivery controller 418 may be in communication with such an ECM, or such an ECM may be entirely omitted from the system.

Figure 5:
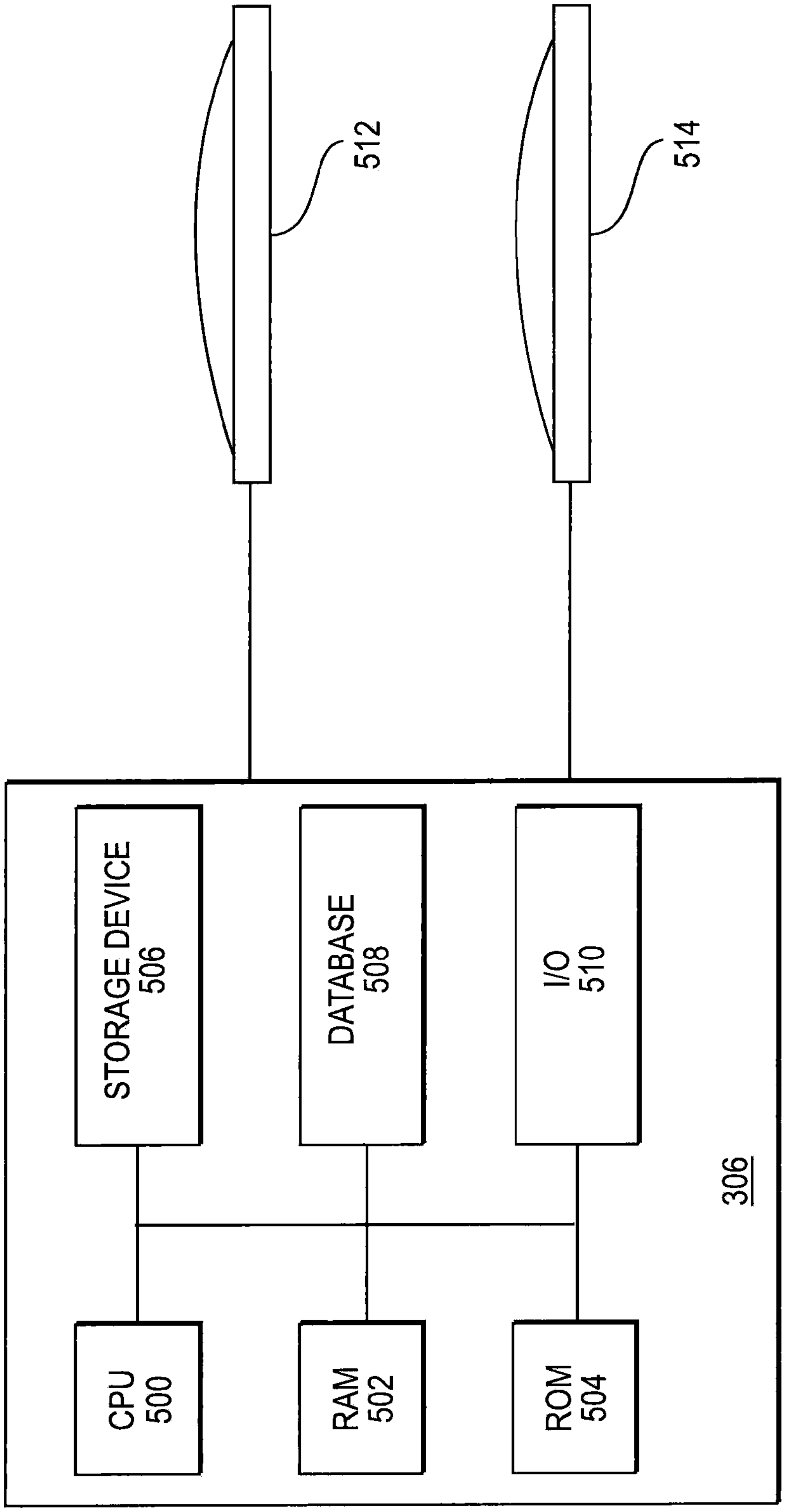
FIG. 5 illustrates a schematic view of an engine control module (ECM) that may be used on the fluid delivery machine of FIG. 2, consistent with the disclosure.

FIG. 5 illustrates ECM 306 in greater detail, consistent with the disclosure. As stated above, ECM 306 may control power source 400 (FIG. 4) that provides motive power to drive fluid delivery machine 106 across worksite 100, based on information from different systems or subsystems of fluid delivery machine 106. ECM 306 also may provide the signal that is used by flow control system 304 (FIG. 2) to determine when fluid delivery system 302 (FIG. 2) is to be turned on and turned off.

ECM 306 may include any type of processor-based system on which processes and methods consistent with the disclosed embodiments may be implemented. For example, as illustrated in FIG. 5, ECM 306 may include one or more hardware and/or software components configured to execute software programs, which precisely determine the ground speed of travel of fluid delivery machine 106 on worksite 100. Specifically, ECM 306 may include one or more hardware components such as a central processing unit (CPU) (processor) 500, a random access memory (RAM) module 502, a read-only memory (ROM) module 504, a storage device 506, a database 508, and one or more input/output (I/O) devices 510. Alternatively and/or additionally, ECM 306 may include one or more software components such as, for example, a tangible, non-transitory computer-readable storage medium including computer-executable instructions to perform methods and processes consistent with the disclosed embodiments. It is contemplated that one or more of the hardware components listed above may be implemented using software. For example, storage device 506 may include a software partition associated with one or more other hardware components of ECM 306. ECM 306 may include additional, fewer, and/or different components than those listed above. It is understood that the components listed above are exemplary only and not intended to be limiting.

Processor 500 may include one or more processors, each configured to execute instructions and/or process data to perform one or more functions associated with ECM 306. As illustrated in FIG. 5, processor 500 may be communicatively coupled to RAM 502, ROM 504, storage device 506, database 508, and I/O devices 510. Processor 500 may be configured to execute sequences of computer program instructions to perform various processes. The computer program instructions may be loaded into RAM 502 for execution by processor 500.

RAM 502 and/or ROM 504 may each include one or more devices for storing information associated with an operation of ECM 306 and/or processor 500. For example, ROM 504 may include a memory device configured to access and store information associated with ECM 306, including information for identifying, initializing, and monitoring the operation of one or more components and subsystems of ECM 306. RAM 502 may include a memory device for storing data associated with one or more operations of processor 500. For example, ROM 504 may load instructions into RAM 502 for execution by processor 500.

Storage device 506 may include any type of mass storage device configured to store information that processor 500 may use to perform processes consistent with the disclosed embodiments. For example, storage device 506 may include one or more magnetic and/or optical disk devices, such as hard drives, CD-ROMs, DVD-ROMs, or any other type of mass media device.

Database 508 may include one or more software and/or hardware components that cooperate to store, organize, sort, filter, and/or arrange data used by ECM 306 and/or processor 500. For example, database 508 may include a plurality of look-up tables that may be used to control power source 400 (FIG. 4) for fluid delivery machine 106 (e.g., motor torque tables, engine torque capability tables, steady state engine data, boost pressure tables, fuel tables, etc.). It is contemplated that database 508 may store additional and/or different information than that listed above.

I/O devices 510 may include one or more components configured to communicate information with a user associated with ECM 306. For example, I/O devices 510 may include a console with an integrated keyboard and mouse to allow a user to input parameters associated with ECM 306. I/O devices 510 may also include a display including a graphical user interface (GUI) for inputting and outputting information on a monitor. I/O devices 510 may further include peripheral devices such as a printer for printing information associated with ECM 306, a user-accessible disk drive (e.g., a USB port, a floppy, CD-ROM, or DVD-ROM drive, etc.) to allow a user to input data stored on a portable media device, a microphone, a speaker system, or any other suitable type of interface device.

ECM 306 may be communicatively coupled to multiple sensors, each of which may be configured to measure at least one operational aspect associated with fluid delivery machine 106. As shown in FIG. 5, a ground speed sensor 512 may be one of the sensors which is coupled to ECM 306. Ground speed sensor 512 may be configured to sense the ground speed of fluid delivery machine 106 during travel on the ground surface of worksite 100. For example, ground speed sensor 512 may sense a rotation of a gear within transmission 402, such as by detecting rotation of a magnetic gear tooth with a Hall Effect sensor. Ground speed sensor 512 is not limited to being a Hall Effect or other type of magnetic-field sensor, however, and is not limited to sensing rotation within transmission 402. Rather, ground speed sensor 512 may be any sensor that senses any characteristic indicative of the ground speed of fluid delivery machine 106.

One or more machine sensors 514 which are configured to sense another characteristic or condition associated with the operation of another system or subsystem of fluid delivery machine 106 may be coupled to ECM 306. For example, machine sensor 514 may be any of: a pitch sensor configured to sense the pitch of fluid delivery machine 106; a sensor (such as a Hall effect or other magnetic-field sensor) configured to sense the movement or rotation of a component (such as a piston, a piston shaft, a rocker arm, an input shaft, or an output shaft) of power source 400; or a sensor (such as a Hall effect or other magnetic-field sensor) configured to sense the movement or rotation of a component (such as an input shaft or an output shaft) of transmission 402. Thus, machine sensor 514 may provide a signal indicative of performance of power source 400. Multiple machine sensors 514 may be connected to ECM 306, sensing each of the above characteristics and/or other characteristics of systems and subsystems of fluid delivery machine 106.

In accordance with the disclosure, ECM 306 may control fluid delivery control system 300 based on signals from ground speed sensor 512 as well as one or more machine sensors 514. In particular, ECM 306 may use the information from one or more machine sensors 514 with the information from ground speed sensor 512, so as to more accurately determine the ground speed of fluid delivery machine 106 as compared to using the information solely from ground speed sensor 512. Exemplary operation of the fluid delivery apparatus as well as the associated method that may be performed consistent with this disclosure is discussed below with reference to FIG. 6.

INDUSTRIAL APPLICABILITY

The disclosed fluid delivery system and method may be applicable to controlling intermittent fluid delivery, based on a signal from an engine control module. Thus, in exemplary embodiments, fluid delivery machine 106 may use the signal from ECM 306 to turn on and turn off the delivery of fluid. Specifically, fluid delivery control system 300 may use the signal from ECM 306 to determine when fluid is to be sprayed onto the ground surface of worksite 100. The following provides an exemplary process for intermittent fluid delivery.

Figure 6:
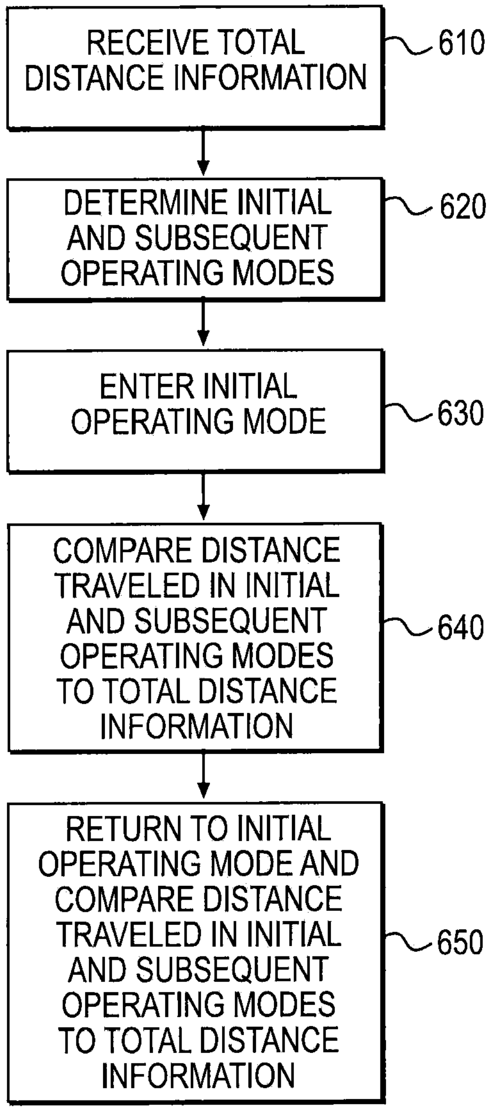
FIG. 6 illustrates an exemplary method of delivering fluid that may be used by the fluid delivery machine of FIG. 2, consistent with the disclosure.

FIG. 6 illustrates an exemplary method of delivering fluid, consistent with the disclosure. As shown in Step 610, fluid delivery machine 106 may receive distance information indicating a total distance over which fluid delivery machine 106 is to be in fluid delivery mode, during which a portion of the fluid stored in tank 200 is sprayed through spray heads 202 onto the ground surface of worksite 100. Fluid delivery machine 106 may also receive distance information indicating a total distance over which fluid delivery machine 106 is to be in fluid non-delivery mode, during which no fluid is sprayed by fluid delivery machine 106. The total distances may be the same as one another, or may be different from one another. For example, the distance information may indicate that fluid delivery machine 106 is to spray fluid from tank 200 (i.e., is to be in fluid delivery mode) while traveling a total distance of 120 feet, and is to travel a total distance of 90 feet without spraying fluid (i.e., is to be in fluid non-delivery mode). By way of another example, the distance information may indicate that fluid delivery machine 106 is to spray fluid from tank 200 while traveling a total distance of 150 feet, and is to travel a total distance of 150 feet without spraying fluid.

This total distance information may be set by an operator of fluid delivery machine 106, or alternately may be set by another person or another source. For example, the distance information may be transmitted, such as over a wireless network, to fluid delivery machine 106 from a computer off-board of fluid delivery machine 106 or a person acting as a worksite supervisor. When the total distance information is set by the operator of fluid delivery machine 106, the distance information may be input through one or more of I/O devices 510 of fluid delivery machine 106. As stated above, I/O devices 510 may include a console with an integrated keyboard and mouse, a display including a graphical user interface (GUI), a monitor, or other devices.

Regardless of how the total distance information is set, the distance information may be stored by fluid delivery machine

106. For example, the distance information may be stored by fluid delivery controller 418. The distance information is not required to be stored by fluid delivery controller 418, however, and may be stored by another component of fluid delivery control system 300, such as ECM 306; by another component of fluid delivery machine 106; or off-board of fluid delivery machine 106.

As shown in Step 620, fluid delivery machine 106 may receive initial operating mode information, which indicates whether fluid delivery machine 106 is to begin traveling with fluid being delivered (i.e., in fluid delivery mode) or without delivering fluid (i.e., in fluid non-delivery mode). This initial operating mode information may be selected or set by the operator of fluid delivery machine 106, or alternately may be selected or set by another person or another source. For example, the initial operating mode information may be transmitted, such as over a wireless transmission, to fluid delivery machine 106 by a computer or worksite supervisor off-board of fluid delivery machine 106. Fluid delivery machine 106 may also set the other operating mode (i.e., fluid delivery mode or fluid non-delivery mode that was not selected as the initial operating mode) as the subsequent operating mode, so that fluid delivery machine 106 performs both fluid delivery and fluid non-delivery in the selected order. When the initial operating mode information is set by the operator of fluid delivery machine 106, the information may be input through one or more I/O devices 510. Regardless of how the initial operating mode information is set, however, the information may be stored by fluid delivery machine 106. For example, the initial operating mode information may be stored by fluid delivery controller 418. The initial operating mode information is not required to be stored by fluid delivery controller 418, however, and may be stored by another component of fluid delivery control system 300, such as ECM 306; by another component of fluid delivery machine 106; or off-board of fluid delivery machine 106.

As shown in Step 630, once fluid delivery machine 106 begins traveling on worksite 100, fluid delivery machine 106 may enter the initial operating mode set in Step 620. In particular, fluid delivery controller 418 may determine that fluid delivery machine 106 is moving, such as by receiving a signal from ECM 306, or from a sensor of fluid delivery machine 106, and may send a signal to flow control system 304 to control fluid delivery system 302 either to begin spraying the ground surface of worksite 100 (when the initial operating mode is fluid delivery mode) or not to spray worksite 100 (when the initial operating mode is fluid non-delivery mode).

As shown in Step 640, fluid delivery machine 106 may compare a distance traveled in the initial operating mode to the total distance set for that operating mode in Step 610. As long as the total distance traveled in the initial operating mode is less than the total distance set for that operating mode, fluid delivery machine 106 may remain in the initial operating mode. When the total distance traveled in the initial operating mode is greater than the total distance set for that operating mode, fluid delivery machine 106 may switch to the subsequent operating mode set in Step 620. For example, the operator of fluid delivery machine 106 may have selected that fluid delivery machine 106 is to travel a total distance of 90 feet in fluid delivery mode, is to travel a total distance of 100 feet in fluid non-delivery mode, and is to start in fluid non-delivery mode. Thus, when fluid delivery machine 106 begins traveling on worksite 100, fluid delivery machine 106 may be switched to fluid non-delivery mode as the initial operating mode. During the time that fluid delivery machine 106 travels a total distance of 100 feet, fluid delivery machine 106 may remain in fluid non-delivery mode. When fluid delivery machine 106 travels more than 100 feet, fluid delivery machine 106 may switch to the subsequent operating mode of fluid delivery mode, in which fluid from tank 100 is sprayed onto the ground surface of worksite 100. Fluid delivery machine 106 may remain in fluid delivery mode, and thus continues to spray the ground surface of worksite 100 with fluid, until fluid delivery machine 106 has traveled a total distance of 90 feet.

The distances traveled by fluid delivery machine 106, in both the fluid delivery mode and the fluid non-delivery mode, may be accurately determined by information gathered by ECM 306. Specifically, ECM 306 may first determine, among other aspects of fluid delivery machine 106, an accurate ground speed of fluid delivery machine 106 on worksite 100. Although ECM 306 may use the signal from ground speed sensor 512 in this determination, ECM 306 also may use signals from one or more machine sensors 514, so that a more accurate indication of ground speed is provided than the ground speed indicated solely by ground speed sensor 512.

When the ground speed of fluid delivery machine 106 is relatively low (e.g., less than about 8 miles per hour), and ground speed sensor 512 is a Hall Effect sensor that senses the rotation of a magnetic gear tooth in transmission 402, the gear may rotate too slowly for ground speed sensor 512 to provide an accurate indication of the ground speed of fluid delivery machine 106. Thus, ECM 306 may use information from one or more machine sensors 514 in addition to the information provided by ground speed sensor 512, so that ECM 306 may provide a more accurate determination of the ground speed of fluid delivery machine 106. As discussed above, machine sensor 514 may determine information about various systems and subsystems of fluid delivery machine 106, such as a pitch of fluid delivery machine 106; a speed of movement or rotation of a piston, a piston shaft, a rocker arm, an input shaft, or an output shaft of power source 400; and/or a speed of movement or rotation of an input shaft or an output shaft of transmission 402. ECM 306 may also determine a rate of change of these values. By performing various algorithms or computational processes to this information, and/or by comparing this information to look up tables stored in ECM 306 or elsewhere, ECM 306 may provide a more accurate measurement of ground speed of fluid delivery machine 106 than that provided solely by information from ground speed sensor 512.

For example, ECM 306 may receive information from ground speed sensor 512 indicating a specific, relatively low, ground speed for fluid delivery machine 106. Fluid delivery machine 106 may subsequently speed up, but not to the extent that ground speed sensor 512 senses the increased speed, because the magnetic gear tooth has not yet been sensed again. But, ECM 306 may receive information from one or more machine sensors 514 indicating an increase in speed of movement or rotation for a piston, a piston shaft, a rocker arm, an input shaft, or an output shaft of power source 400, or for an input shaft or an output shaft of transmission 402. ECM 306 may process this additional information and determine fluid delivery machine 106 is moving at a higher ground speed than last indicated by ground speed sensor 512.

By way of another example, example, ECM 306 may receive information from ground speed sensor 512 indicating a specific, relatively low, ground speed for fluid delivery machine 106. Fluid delivery machine 106 may subsequently slow down, but not to the extent that ground speed sensor 512 senses the decreased speed, because the magnetic gear tooth has not yet been sensed again. But, ECM 306 may receive information from one or more machine sensors 514 indicating a decrease in speed of movement or rotation for a piston, a piston shaft, a rocker arm, an input shaft, or an output shaft of power source 400, or for an input shaft or an output shaft of transmission 402. ECM 306 may process this additional information and determine fluid delivery machine 106 is moving at a lower ground speed than last indicated by ground speed sensor 512.

The ground speed information may be encrypted by ECM 306, and may be sent to various systems and subsystems of fluid delivery machine 106, where it is decrypted and used as appropriate. For example, the encrypted ground speed information may be sent to a speedometer (not shown) of fluid delivery machine 106, which decrypts and displays the ground speed of fluid delivery machine 106. The encrypted ground speed information also may be sent to fluid delivery controller 418, where is it decrypted. The decrypted ground speed may then be processed, in conjunction with time information, to accurately determine a travel distance of fluid delivery machine 106. The time information may be determined by fluid delivery controller 418. Alternately, the time information may be determined by any other component, system, or subsystem of fluid delivery machine 106, such as ECM 306 for example.

As shown in Step 650, after fluid delivery machine 106 travels the total distance set for the initial operating mode as well as the total distance set for the subsequent operating mode, fluid delivery machine 106 may switch back to the initial operating mode, and may travel the total distance set for that operating mode in Step 610. After fluid delivery machine 106 has again traveled the total distance set for the initial operating mode, fluid delivery machine 106 may switch back to the subsequent operating mode, and may travel the total distance set for that operating mode in Step 610. Step 650 may be repeated as long as fluid delivery machine 106 continues to drive on worksite 100, or may be repeated a predetermined number of times. In other embodiments, Step 650 may be repeated until fluid delivery control system 300 is shut off, fluid delivery machine 106 stops moving on worksite 100, or new total distance information is input for either or both of fluid delivery mode or fluid non-delivery mode (Step 610), such that the process illustrated in FIG. 6 begins again.

In accordance with the above description, the disclosed fluid delivery system and method that use a signal from an engine control module to turn on and off fluid delivery may provide numerous advantages over known systems and methods. For example, as discussed above ECM 306 may more accurately determine the ground speed, and thus may more accurately determine the travel distance, of fluid delivery machine 106 as it travels across worksite 100 because ECM 306 uses information from one or more sensors that sense characteristics other than ground speed of fluid delivery machine 106. In contrast, accurate travel distance information may not be provided by known systems and methods using a programmable logic controller (PLC), as the PLC may merely convert information output by a ground speed sensor from one form to another form, or the PLC may solely use the information from the ground speed sensor. Therefore, fluid delivery machine 106 may more accurately control fluid delivery and non-delivery to the ground surface of worksite 100, and thus may better avoid overwatering the ground surfaces of haul roads 104, so that if heavy machinery driving on haul roads 104 begins to slip, the heavy machinery will subsequently encounter a dry portion of haul road 104 and stop slipping.

It will be apparent to those skilled in the art that various modifications and variations may be made to the fluid delivery system and method of the present disclosure. It is intended that the specification and examples be considered as exemplary only, with a true scope of the disclosure being indicated by the following claims and their equivalents.

What is claimed is:

1. A method of controlling a fluid delivery machine configured to deliver fluid on a worksite, the method comprising:
- determining a fluid delivery distance over which the fluid delivery machine is to drive on the worksite while delivering fluid;
- controlling, with a control module, operation of a power source of the fluid delivery machine; and
- controlling the delivery of fluid on the worksite with the control module, wherein controlling the delivery of fluid includes delivering fluid on the worksite while a first total distance traveled by the fluid delivery machine is less than the fluid delivery distance, the first total distance being determined by the control module.

2. The method of claim 1, wherein the first total distance is determined by the control module based on a signal from a ground speed sensor.

3. The method of claim 1, wherein the first total distance is determined by the control module based on both a signal from a ground speed sensor and a signal from a sensor monitoring the power source.

4. The method of claim 1, wherein the first total distance is determined by the control module based on a signal from a ground speed sensor.

5. The method of claim 1, the method further including:
- determining a fluid non-delivery distance over which the fluid delivery machine is to drive on the worksite without delivering fluid; and
- traversing the worksite without delivering fluid while a second total distance traveled by the fluid delivery machine is less than the fluid non-delivery distance, the second total distance being determined by the control module.

6. The method of claim 5, wherein
- the power source is an engine,
- the control module is an engine control module,
- the first total distance is determined by the engine control module based on a signal from a ground speed sensor and a signal from a sensor monitoring the engine, and
- the second total distance is determined by the engine control module based on the signal from the ground speed sensor and the signal from the sensor monitoring the engine.

7. The method of claim 6, wherein delivering fluid on the worksite includes spraying fluid stored in a tank of the fluid delivery machine onto a ground surface of the worksite.

8. The method of claim 7, wherein spraying includes spraying the fluid stored in the tank through at least one spray head onto the ground surface of the worksite.

9. The method of claim 6, wherein determining the fluid delivery distance includes receiving fluid delivery distance information from an input device of the fluid delivery machine, and determining the fluid non-delivery distance includes receiving fluid non-delivery distance information from the input device.

10. A method of controlling a fluid delivery machine configured to deliver fluid on a worksite, the method comprising:
- controlling, with an engine control module, operation of an engine of the fluid delivery machine;
- determining, for a fluid delivery mode, a fluid delivery distance over which the fluid delivery machine is to drive on the worksite while delivering fluid to the worksite;

determining, for a fluid non-delivery mode, a fluid non-delivery distance over which the fluid delivery machine is to drive on the worksite without delivering fluid;

selecting, as an initial operating mode in which the fluid delivery machine is to begin driving on the worksite, either the fluid delivery mode or the fluid non-delivery mode;

determining, as a subsequent operating mode in which the fluid delivery machine is to drive on the worksite after completion of the initial operating mode, the fluid delivery mode or the fluid non-delivery mode that was not selected as the initial operating mode;

switching the fluid delivery machine to the initial operating mode when the fluid delivery machine begins to drive on the worksite;

operating the fluid delivery machine in the initial operating mode while a first total distance traveled by the fluid delivery machine is less than either the fluid non-delivery distance when the initial operating mode is the fluid non-delivery mode, or the fluid delivery distance when the initial operating mode is the fluid delivery mode, the first total distance being determined by the engine control module;

switching the fluid delivery machine from the initial operating mode to the subsequent operating mode upon completion of the initial operating mode; and operating the fluid delivery machine in the subsequent operating mode while a second total distance traveled by the fluid delivery machine is less than either the fluid non-delivery distance when the subsequent operating mode is the fluid non-delivery mode, or the fluid delivery distance when the subsequent operating mode is the fluid delivery mode, the second total distance being determined by the engine control module.

11. The method of claim 10, wherein the engine is an internal combustion engine configured to provide power used by the fluid delivery machine to drive over the worksite.

12. The method of claim 11, wherein the engine control module determines the first total distance based on a signal from a sensor that senses a ground speed of the fluid delivery machine on the worksite.

13. The method of claim 11, wherein the engine control module determines the first total distance based on both a signal from a sensor that senses a ground speed of the fluid delivery machine on the worksite and a signal indicative of engine performance.

14. The method of claim 11, wherein the engine control module determines the first total distance based on both a signal from a sensor that senses a ground speed of the fluid delivery machine on the worksite and a signal from a sensor that senses a speed of a component of a transmission operatively connected to the engine.

15. The method of claim 11, wherein the engine control module determines the first total distance based on both a signal from a sensor that senses a ground speed of the fluid delivery machine on the worksite and a signal from a sensor that senses a speed of a component of the engine.

16. The method of claim 11, wherein the engine control module determines the first total distance based on a signal from a sensor that senses a ground speed of the fluid delivery machine on the worksite, a signal from a sensor that senses a speed of a component of the engine, and a signal from a sensor that senses a speed of a component of a transmission operatively connected to the engine.

17. A non-transitory computer readable medium storing a program that, when executed by a processor, performs a method of controlling a fluid delivery machine configured to deliver fluid on a worksite, the method comprising:

controlling, with a control module, operation of a power source of the fluid delivery machine;

determining a fluid delivery distance over which the fluid delivery machine is to drive on the worksite while delivering fluid; and delivering fluid on the worksite while a first total distance traveled by the fluid delivery machine is less than the fluid delivery distance, the first total distance being determined by the control module.

18. The non-transitory computer readable medium of claim 17, wherein the first total distance is determined by the control module based on both a signal from a sensor that senses a ground speed of the fluid delivery machine and a signal from a sensor monitoring the power source.

19. The non-transitory computer readable medium of claim 17, wherein the method further includes:

determining a fluid non-delivery distance over which the fluid delivery machine is to drive on the worksite without delivering fluid; and traversing the worksite without delivering fluid while a second total distance traveled by the fluid delivery machine is less than the fluid non-delivery distance, the second total distance being determined by the control module.

* * * * *